United States Patent
Arndt et al.

(10) Patent No.: US 6,883,491 B2
(45) Date of Patent: Apr. 26, 2005

(54) FUEL INJECTION SYSTEM

(75) Inventors: Stefan Arndt, Stuttgart (DE); Gernot Würfel, Vaihingen/Enz (DE); Jürgen Raimann, Weil Der Stadt (DE); Roman Grzeszik, Dransfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/333,656

(22) PCT Filed: May 10, 2002

(86) PCT No.: PCT/DE02/01694

§ 371 (c)(1),
(2), (4) Date: Jul. 24, 2003

(87) PCT Pub. No.: WO02/095201

PCT Pub. Date: Nov. 28, 2002

(65) Prior Publication Data

US 2004/0020459 A1 Feb. 5, 2004

(30) Foreign Application Priority Data

May 21, 2001 (DE) .......................... 101 24 750

(51) Int. Cl.[7] .................................................. F02B 1/02
(52) U.S. Cl. ..................................................... 123/305
(58) Field of Search ................................. 123/295, 298, 123/302, 305

(56) References Cited

U.S. PATENT DOCUMENTS

| | | |
|---|---|---|
| 5,170,758 A | 12/1992 | Chmela |
| 5,735,240 A | 4/1998 | Ito et al. |
| 6,045,063 A * | 4/2000 | Koike et al. .............. 239/533.3 |
| 2002/0038645 A1 * | 4/2002 | Chmela et al. .............. 123/305 |
| 2003/0010313 A1 * | 1/2003 | Fukuzumi .................... 123/302 |
| 2004/0011326 A1 * | 1/2004 | Yamashita et al. .......... 123/305 |

FOREIGN PATENT DOCUMENTS

| | | |
|---|---|---|
| DE | 38 08 635 | 9/1989 |
| DE | 196 42 653 | 1/1998 |
| DE | 198 04 463 | 8/1999 |
| EP | 0 519 275 | 12/1992 |
| JP | 62 288314 | 12/1987 |
| JP | 05 214938 | 12/1993 |
| JP | 06 081656 | 3/1994 |
| JP | 11 050848 | 2/1999 |

* cited by examiner

*Primary Examiner*—Erick Solis
(74) *Attorney, Agent, or Firm*—Kenyon & Kenyon

(57) ABSTRACT

A fuel-injection system for internal combustion engines has at least one fuel injector injecting fuel into a combustion chamber, which is delimited by a cylinder wall in which a piston is guided. A spark plug projects into the combustion chamber, and the fuel injector is located in the combustion chamber in the region of a gas-intake valve toward the cylinder wall. The fuel injector produces a plurality of fuel jets at least one of these fuel jets being tangentially oriented to the region of the spark plug.

13 Claims, 2 Drawing Sheets

FUEL INJECTION SYSTEM

FIELD OF THE INVENTION

The present invention is directed to a fuel injection system.

BACKGROUND INFORMATION

In mixture-compressing internal combustion engines having external ignition and internal mixture formation, stratified charge operation requires a "mixture cloud" in the region of the spark plug, which must have a particular fuel-air ratio in the ignitable range. Especially in partial load operation and during idling, this has a considerable effect on fuel consumption since the entire combustion chamber volume is not filled with an enriched, ignitable mixture.

Basically, three methods are known for producing such a mixture cloud: the wall-directed, the air-directed and the jet-directed fuel-injection system.

In the wall-directed fuel-injection system, the fuel is carried along by an air vortex which lies up against the wall of the cylinder and in most cases is deflected at the specially designed piston. For this purpose, a fuel injector, which is positioned at the side of the intake valve toward the cylinder wall, injects the fuel into a vortex near the wall surface of the cylinder and/or onto the piston surface. The vortex causes the fuel to be carried along to the spark plug in the center of the combustion chamber, a mixture being formed at the same time.

A wall-directed fuel-injection system is known from European Published Patent Application No. 0 519 275, for instance. A spark plug is positioned in a center section of an inner wall of a cylinder head, and a fuel-injection device is located at a circumferential section of the inner wall of the cylinder head. A piston has an indented section beneath the spark plug, onto whose surface the fuel is injected at a slant, the fuel being deflected at the edge of the indented surface. A vortex carries along the fuel in the direction of the spark plug.

Disadvantageous in this related art is that the turbulence-producing measures, such as special designs of the combustion-chamber geometry, especially the piston form designs, can only be optimized for a specific speed range. Especially in the area of partial load and idling, i.e. when small fuel-injection quantities and low filling degrees and/or low speed are involved; the required vortex formations can only be achieved by throttling. This, however, results in higher fuel consumption. Moreover, it is disadvantageous that the wall-directed fuel-injection system requires a more costly piston design with a deflection edge.

From German Patent No. 38 08 635, a fuel injection device for the direct injection of fuel into the cylinder of a mixture-compressing internal combustion engine is known in the form of an air-directed fuel-injection system. The fuel injection device includes a fuel injector, which is positioned in the cylinder wall at a certain distance from the cylinder head and across from the discharge orifice; it has an outlet opening, the jet axis of the fuel injector being directed to the region around the spark plug positioned in the cylinder head. The fuel injector includes a magnet-activated valve needle provided with helical swirl grooves to generate a swirl flow of the injection jet. The entire cross-sectional area of the swirl grooves is smaller than the cross-sectional surface of the outlet opening by at least half, the fuel injector being positioned above a flushing orifice and its jet axis pointing to the ignition point located in the center of the cylinder head. Owing to the air stream, the injected fuel is carried along in the direction of the spark plug and conveyed thereto without touching the cylinder wall.

In air-directed fuel-injection systems as well, the mixture conveyance to the spark plug is less than successful in idling operation and in lower partial-load operation, due to the aforementioned reasons; in mean partial-load operation it is partly only possible with unjustifiably low production variances of the high-pressure fuel injectors utilized and/or the flow guidance through the intake manifold. The faulty reproducibility primarily manifests itself in increased emissions of unburned hydrocarbons as a result of individual combustion misses.

From German Published Patent Application No. 198 04 463, a jet-directed fuel injection system for mixture-compressing internal combustion engines having external ignition is known, which includes at least one fuel injector injecting the fuel into a combustion chamber having a piston/cylinder design, and which is provided with a spark plug projecting into the combustion chamber. The nozzle body of the fuel injector is located in the vicinity of the spark plug, which is in the center of the combustion chamber, and it is provided with at least one row of injection orifices distributed over the circumference of the nozzle body. By selectively injecting fuel via the injection orifices, a jet-controlled combustion method is realized by a mixture cloud being formed, at least one jet being aimed in the direction of the spark plug. Additional jets ensure that an at least approximately continuous or cohesive mixture cloud is formed.

A method of forming an ignitable fuel/air mixture is known from German Patent No. 196 42 653. An ignitable fuel/air mixture can be formed in the cylinders of internal combustion engines having direct injection in that an injector injects fuel into each combustion chamber bounded by a piston upon release of a nozzle orifice in response to a valve member lifting off from a valve seat which encircles the nozzle orifice. To produce an internal mixture formation that is optimized with respect to consumption and emissions, in every operating point of the entire characteristics map, under all operating conditions of the internal combustion engine, particularly in stratified operation, the opening stroke of the valve member and the injection time are variably adjustable.

Disadvantageous in jet-directed fuel-injection systems is that currently used cylinder heads having a spark plug centrally positioned in the cylinder axis in the cylinder head, can only be used when substantially modified, since the additional installation space for the fuel injector in the vicinity of the spark plug requires a disadvantageous moving of the, in most cases, two intake valves.

While the currently used production tools and cylinder-head designs may in fact be compatible when the fuel injector is positioned in the cylinder wall on the side of the intake valves, the afore-described disadvantages of the air-directed and the wall-directed fuel-injection systems still occur.

SUMMARY OF THE INVENTION

In contrast, the fuel-injection system according to the present invention has the advantage over the related art that it allows the fuel injector to be placed on the cylinder wall in the cylinder head, on the side of the intake valves. Moreover, in the manufacture, the cylinder head is compatible with the currently used cylinder heads for manifold injection, and the disadvantages of the wall-directed and the air-directed fuel-injection systems are avoided, since the fuel-injection system according to the present invention is a jet-directed fuel-injection system. Contrary to preconceived notions of the technical world, it has been shown that a jet-directed mixture cloud is able to be generated in partial-load operation even from the position of the fuel injector provided for in the fuel-injection system according to the present invention. A fuel jet of a multiple-orifice fuel injector may be injected with sufficient precision through half the cylinder diameter.

Moreover, it is advantageous that the mixture formation for ignition does not rely on a vortex being formed, and the combustion-chamber geometry, especially the piston design, may be freely selected so that it is optimal in view of additional aspects.

In particular, thermal-shock load and coking of the spark plug are reduced by the tangential injection of fuel relative to the spark-plug position. The fuel jets, thus, are not directly aimed at the spark plug.

Furthermore, it is advantageous that, given an appropriately selected angle, a favorable ignition curve is able to be achieved by two injection jets and by placing the spark plug on the bisectrix between these fuel jets.

Additional fuel jets may advantageously be directed towards the remaining combustion chamber that is formed when the piston is approximately in the vicinity of top dead center.

In particular, it is possible to advantageously allocate the fuel jets to three planes, which assume identical angles of between approximately 20° and 30° with respect to each other. In this context, the uppermost plane, which is closest to the cylinder head, is made up of the two fuel jets flanking the spark plug; the second is made up of three fuel jets, of which the center jet is located on the bisectrix of the fuel jets of the first level, projected in the direction of the cylinder axis, and the lowest plane in turn is made up of two fuel jets positioned beneath those of the first plane. Such a design of the fuel jets allows good propagation of the flame front across the three planes, following ignition.

The piston may be designed to include a quenching edge and a piston recess, and the form of the jet pattern may be adjusted to the combustion chamber determined thereby.

The fuel jets may be flat jets, which are injected through slits as spray-discharge orifices.

In an alternative, advantageous specific embodiment, the additional fuel jets are located in a plane together with the fuel jets that are in tangential alignment with respect to the spark plug; they are even in number and positioned on both sides of the spark plug in matching numbers.

This specific embodiment allows an advantageous mixture formation, especially when no piston recess is provided, or only a very shallow one.

DETAILED DESCRIPTION

Figure 1:
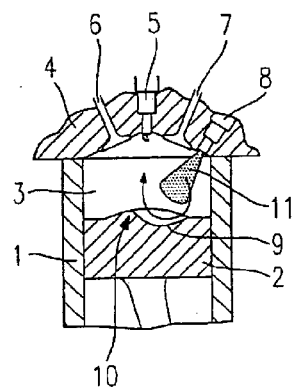
FIG. 1 shows a schematic section through a fuel-injection system according to the related art for a wall-directed combustion method.
Figure 2:
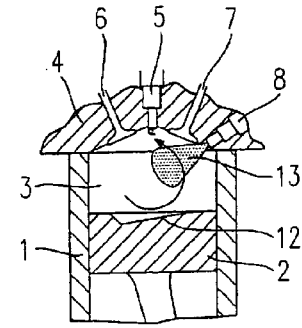
FIG. 2 shows a schematic section through a fuel-injection system according to the related art for an air-directed combustion method.
Figure 3:
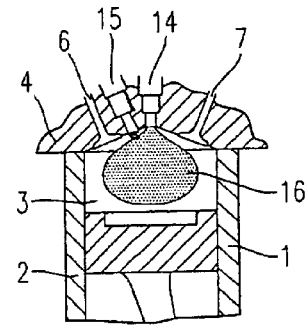
FIG. 3 shows a schematic section through a fuel-injection system according to the related art for a jet-directed combustion method.

FIGS. 1, 2 and 3 schematically show the basic design of the three most important fuel-injection systems according to the related art, to first delineate the respective advantages and disadvantages and to explain to what extent the present invention combines the advantages of the fuel-injection systems while avoiding the disadvantages.

FIG. 1 shows a schematic section through a fuel-injection system according to the related art for a wall-directed combustion method. A piston 2 is guided in a cylinder 1, represented schematically in a cut-away view. A combustion chamber 3 is delimited by a cylinder head 4 resting on cylinder 1. A spark plug 5 is in the center of cylinder 1, and a discharge valve 6 and an intake valve 7 are located on the side, for the gas exchange. Normally, two intake valves 7 and discharge valves 6 are provided in most cases. A fuel injector 8 is located in cylinder head 4 on the side of intake valve 7 toward the wall of cylinder 1. Piston 2 has a distinctly formed piston recess 9 and, approximately in the piston center, a deflection edge 10 which delimits piston recess 9.

Fuel injector 8 injects fuel in the direction of piston recess 9. This is indicated in FIG. 1 by a fuel cloud 11. In the process, the fuel strikes the vortex, formed by air, and piston recess 9. The vortex causes the fuel to be carried to deflection edge 10 and, forming a mixture, conveys it to spark plug 5. The path of this mixture cloud is indicated by an arrow.

FIG. 2 shows a schematic section through a fuel-injection system according to the related art for an air-directed fuel-injection system. To the extent that the basic design is identical to the components of cylinder 1, piston 2, combustion chamber 3, cylinder head 4, spark plug 5, discharge valve 6, intake valve 7 and fuel injector 8 of FIG. 1, the same reference numerals have been used. In a departure, a relatively flat piston recess 12 is formed at piston 2.

Fuel injector 8 injects the fuel in the direction of a vortex in combustion chamber 3. This is indicated by a fuel cloud 13 in FIG. 2. Because of the vortex, the fuel, forming a mixture, is propelled to spark plug 5 without making contact with a wall. The path of this mixture cloud is indicated by an arrow.

Wall-directed and air-directed fuel-injection systems offer the advantage of a convenient placement of fuel injector 8, which allows cylinder head 4 to be very similar to conventional cylinder heads for the manifold injection and the continued use of production facilities. Disadvantageous is the always required vortex formation, which complicates an optimization of the combustion chamber in view of other aspects, and which can only be optimized for certain speeds and load states; it also leads to throttling losses.

FIG. 3 shows a schematic section through a fuel-injection system according to the related art for a jet-directed combustion method. To the extent that the basic design is identical to the components of cylinder 1, piston 2, combustion chamber 3, cylinder head 4, spark plug 5, discharge valve 6, intake valve 7 and fuel injector 8 of FIG. 1, the same reference numerals have been used. In a departure, a fuel injector 14 and a spark plug 15 are centrally positioned in the center of cylinder 1 in combustion chamber 3.

A mixture cloud 15, made up of individual fuel jets, is injected into combustion chamber 3 by fuel injector 14. In the process, at least portions of fuel cloud 16 are injected directly toward the vicinity of spark plug 14 where they produce an ignitable mixture.

A jet-directed fuel-injection system offers the advantage of relative freedom in the design of the remaining combustion chamber 3. In addition, there are no throttling losses. Disadvantageous is the placement of fuel injector 15, which is unfavorable from the viewpoint of production engineering and installation space.

Figure 4:
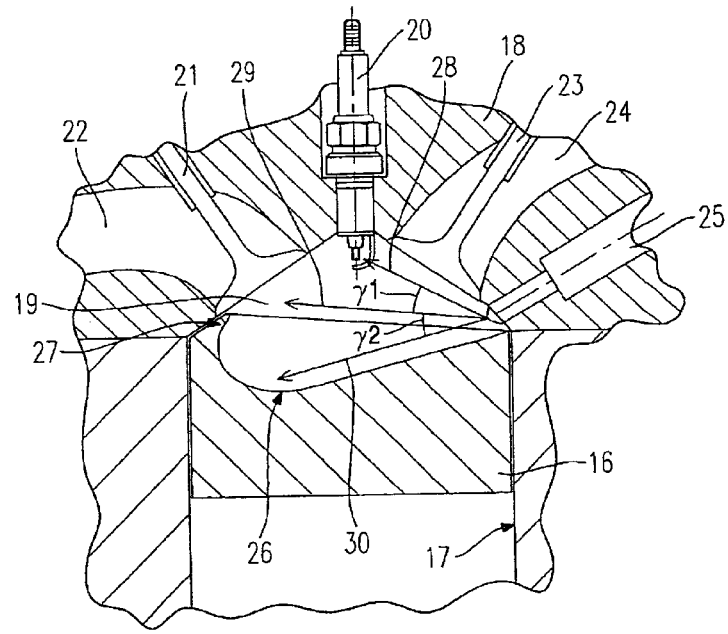
FIG. 4 shows a schematic section through a first exemplary embodiment of the fuel-injection system designed according to the present invention.

FIG. 4 shows a schematic section through a first exemplary embodiment of the fuel-injection system according to the present invention; it has a piston 16, which is guided in a cylinder bore 17 and delimits a combustion chamber 19 together with a cylinder head 18. A spark plug 20 is located in the center of cylinder bore 17, and a discharge valve 21, having outlet channel 22, and an intake valve 23, having an intake channel 24, are located on the side for the gas exchange. Normally, two intake valves 23 and discharge valves 21 are provided in most cases. A fuel injector 25 is located in cylinder head 18 on the side of intake valve 23 toward the wall of cylinder bore 17. Piston 16 has a distinctly formed piston recess 26 and a quenching edge 27 delimiting piston recess 26.

Piston 16 is shown in cylinder bore 17 in a position corresponding to the instant when fuel is injected through fuel injector 25. Fuel injector 25 has spray-discharge orifices, which are configured such that fuel jets 28 of a first plane spray-discharge towards the region of spark plug 20. With respect to the planes, fuel jets 29 of a second plane assume an angle γ1 relative to the fuel jets of the first plane. Fuel jets 30 of a third plane, which, with respect to the planes, assume an angle γ2 relative to the fuel jets of the second plane, fill the region of piston recess 26. Arrows indicate the fuel jets. Angle γ1 is identical to angle γ2.

Figure 5:
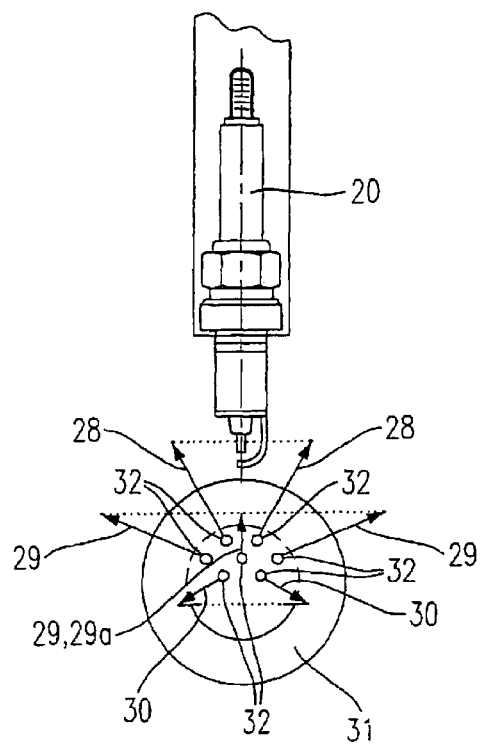
FIG. 5 shows a schematic representation of the spray-discharge section of the fuel injector in FIG. 4, in a plan view, and its orientation toward the spark plug.

FIG. 5 shows a schematic representation of a spray-discharge section 31 of fuel injector 25 of FIG. 4, in a plan view, and its orientation toward spark plug 20. Fuel jets 29, 30, 31, indicated by arrows, of the three planes are spray-discharged from spray-discharge orifices 32. In the exemplary embodiment described here, two fuel jets 29 of the first plane are aligned tangentially with respect to spark plug 20 and oriented such that spark plug 20 is located on a bisectrix of fuel jets 29 of the first plane. A dotted line between the arrowheads shows the configuration in one plane. Three fuel jets 30 of the second plane are configured to be offset from fuel jets 29 of the first plane, so that the center fuel jet 29a is oriented underneath spark plug 20. Two fuel jets 30 of the third plane are directed underneath fuel jets 28 of the first plane.

Figure 6:
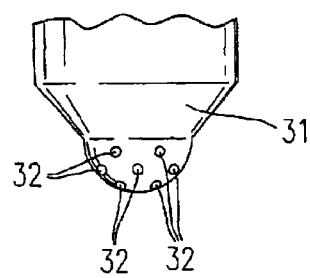
FIG. 6 shows a schematic representation of the spray-discharge section of the fuel injector of FIG. 4, in a side view.

FIG. 6 shows a schematic representation of spray-discharge section 31 of fuel injector 25 of FIG. 4 in a side view, viewed from the direction of spark plug 20. Spray-discharge orifices 32 are distributed over a spherical surface 33 in three rows. This configuration makes it possible to achieve a spray-discharge in three planes.

In the specific embodiment of the present fuel-injection system according to the present invention, fuel injector 25 is advantageously able to be positioned on the side of combustion chamber 19, thereby making it highly compatible with conventional cylinder heads. The remaining combustion chamber may be designed relatively freely, since fuel jets 29 of the first plane form an ignitable mixture in the region of spark plug 20. In particular, due to the present advantageous specific embodiment, the entire combustion chamber 19, including the region of piston recess 26, is able to be reached by fuel jets. Contrary to the currently held view, it has been shown that it is possible to inject a fuel jet 28 from the side of combustion chamber 19 toward spark plug 20.

Figure 7:
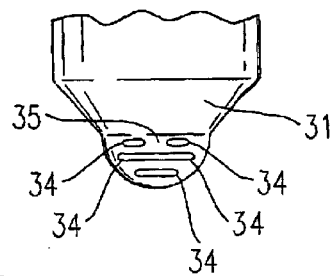
FIG. 7 shows a schematic representation of the spray-discharge section of the fuel injector of FIG. 4 in an advantageous specific embodiment, in a side view.

FIG. 7 shows a schematic representation of spray-discharge section 31 of fuel injector 25 of FIG. 4 in an alternative, advantageous specific embodiment, in a side view, viewed from the direction of spark plug 20. Instead of spray-discharge orifices, slits 34 are provided in this case, thereby making it possible to produce flat jets. A web 35 prevents fuel from being spray-discharged directly onto spark plug 25.

Figure 8:
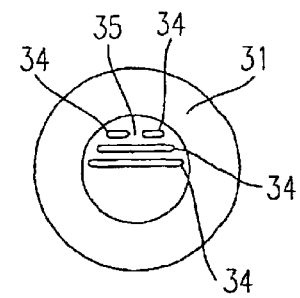
FIG. 8 shows a schematic representation of the spray-discharge section of the fuel injector of FIG. 7, in a plan view.

FIG. 8 shows a schematic representation of spray-discharge section 31 of fuel injector 25 of FIG. 7 in a plan view. Slits 34 and web 35 are shown.

The present invention is not limited to the exemplary embodiments shown, and is also applicable, for instance, to fuel-injection systems having more or fewer injection orifices, intake and discharge valves, and, in particular, more spark plugs and variable cubic capacity.

What is claimed is:

1. A fuel-injection system for an internal combustion engine, comprising:
   at least one fuel injector for injecting a fuel into a combustion chamber that is delimited by a cylinder wall in which a piston is guided;
   a spark plug projecting into the combustion chamber, the at least one fuel injector being located in the combustion chamber in a region of a gas-intake valve toward the cylinder wall and producing a plurality of fuel jets,
   wherein:
   at least one of the plurality of fuel jets has a tangential orientation into a region of the spark plug,
   spray-discharge orifices of the at least one fuel injector are distributed in such a manner that at least two of the plurality of fuel jets are injected at a predefined opening angle into the combustion chamber, tangentially to the spark plug,
   the spark plug is located on a bisectrix of the predefined opening angle,
   the predefined opening angle, as a function of a clearance of the at least one fuel injector to the spark plug, is dimensioned such that an ignitable mixture is produced on both sides tangentially to an ignition electrode of the spark plug,
   at a piston position near top dead center, at least some of the plurality of fuel jets are evenly aligned with the combustion chamber, and
   the plurality of fuel jets are oriented in three planes at an angle γ1 between a first plane and a second plane, and
   at an angle γ2 between the second plane and a third plane, the first plane, which is closest to a cylinder head, is formed by two of the plurality of fuel jets that are tangentially aligned to the spark plug.

2. The fuel-injection system as recited in claim 1, wherein:
   the second plane is formed by three of the plurality of fuel jets that are offset with respect to the fuel jets of the first plane, and a center fuel jet is beneath the bisectrix of the opening angle of the fuel jets of the first plane.

3. The fuel-injection system as recited in claim 2, wherein:

the third plane includes two fuel jets that are located beneath the fuel jets of the first plane.

4. The fuel injection system as recited in claim 1, wherein: the angle γ1 has a value of between 20° and 30°.

5. The fuel injection system as recited in claim 1, wherein: the angle γ2 has a value of between 200 and 30°.

6. The fuel injection system as recited in claim 1, wherein: the angle γ1 is identical to the angle γ2.

7. The fuel-injection system as recited in claim 1, wherein:

the plurality of fuel jets include an even number of fuel jets, and a matching number is aligned on both sides of the spark plug.

8. The fuel injection system as recited in claim 1, wherein:

the plurality of fuel jets are flat jets and are formed by longitudinal spray-discharge orifices of the at least one fuel injector.

9. The fuel-injection system as recited in claim 8, wherein:

the spray-discharge orifices are slits.

10. The fuel-injection system as recited in claim 8, wherein:

the slits are subdivided by webs.

11. The fuel injection system as recited in claim 1, wherein:

the piston, on a side lying opposite from the at least one fuel injector relative to a cylinder center axis, is provided with a quenching edge.

12. The fuel injection system as recited in claim 1, wherein:

the piston includes a piston recess.

13. The fuel-injection system as recited in claim 12, wherein:

the piston recess is adapted to the form of a jet pattern of the at least one fuel injector, and none of the plurality of fuel jets directly strikes a piston surface.

* * * * *